United States Patent [19]
Obermeier et al.

[11] Patent Number: 5,174,157
[45] Date of Patent: Dec. 29, 1992

[54] PRESSURE TRANSDUCER

[75] Inventors: Horst Obermeier, Hüllhorst; Emrullah Altiok, Minden, both of Fed. Rep. of Germany

[73] Assignee: Schoppe & Faeser GmbH, Minden, Fed. Rep. of Germany

[21] Appl. No.: 712,921

[22] Filed: Jun. 7, 1991

[30] Foreign Application Priority Data

Jun. 11, 1990 [DE] Fed. Rep. of Germany ....... 4018638

[51] Int. Cl.⁵ ............................................. G01L 7/08
[52] U.S. Cl. ....................................... 73/715; 73/756; 92/102; 92/103 SD
[58] Field of Search ................. 73/727, 756, 721, 708, 73/706, 718, 719, 720, 723, 724, 725, 726, 753, 754, 715, 756; 338/4; 361/283; 92/102, 103 SD

[56] References Cited

U.S. PATENT DOCUMENTS 4,414,851 11/1983 Maglic ................................. 73/724
4,425,799 1/1984 Park ..................................... 73/718

FOREIGN PATENT DOCUMENTS 3137219 4/1983 Fed. Rep. of Germany ........ 73/724

Primary Examiner—Donald O. Woodiel
Attorney, Agent, or Firm—R. H. Siegemund

[57] ABSTRACT

A pressure transducer including a rotationally symmetrical pressure sensor made of a ceramic material and having a front face configured as a membrane, further having a housing for and containing the pressure sensor, the housing having a rotationally symmetrical base part and a pot with side walls gripping around the base part, and a sealing ring is interposed between the membrane of the pressure sensor and the base part of the housing, is improved by a glass layer of about 10 μm thickness having been pressure deposited by screen printed for covering at least a portion of the membrane where facing the base part of the housing and being intimately bonded to the sealing ring.

7 Claims, 2 Drawing Sheets

PRESSURE TRANSDUCER

BACKGROUND OF THE INVENTION

The present invention relates to a pressure transducer with a sensing element made of a ceramic material and having a contour exhibiting rotational symmetry, and more particularly the invention relates to a pressure transducer with a rotationally symmetrical pressure sensor element of ceramic with a front face configured as a membrane, a housing which is of a pot-like configuration and embraces the pressure sensor, the housing being also configured in a rotational symmetry and the transducer further includes a sealing ring between the membrane and the base part of the housing.

A pressure transducer of the kind to which the invention pertains is basically known through German Printed Petty—Patent or Utility Model 89 14 010. It indeed includes a pressure sensor made of a ceramic material, having rotational symmetry and being contained in a housing that is provided with a rotational symmetrical base part and a pot or cup like configuration reaching beyond and around the side walls of this base part. The front face of the pressure sensor is configured as a membrane, and between it and the base part of the housing is provided a sealing ring more or less covering the edges of the pressure sensor. The sealing ring is to prevent penetration of the process material into the interior of the housing. The process material will appear, for instance, in a space between the front of the pressure sensor (i.e. the membrane) and the base part of the housing, but should not propagate any further. The presence of the gas, or more generally, pressure medium at that location adjacent to the membrane was needed in order to obtain a measuring response of the transducer, but the gas should be kept away from other equipment. A particular problem arises if the pressure sensor is provided with a surface of relatively coarse texture. Here, then, sealing may not be adequate.

DESCRIPTION OF THE INVENTION

It is an object of the present invention to provide a new and improved measuring transducer of the kind referred to above, permitting improvement of the sealing between the membrane of the transducer sensor proper and a sealing ring between it and the housing.

It is therefore a specific object of the present invention to provide a new and improved pressure measuring transducer which includes a rotationally symmetrical pressure sensor made of a ceramic material and having a front face configured as a membrane, further including a housing or container for the pressure sensor, which housing includes a rotationally symmetrical base part for connection to the process facility to be monitored and a pot which has sidewalls gripping around and over the base part, further including a sealing ring being interposed between the membrane of the pressure sensor and the base part of the housing and being arranged basically around the edge or rim portion of the pressuring sensor.

In accordance with a preferred embodiment of the present invention, the objects and particularly the specific object are attained in that the edge of the membrane is provided with a glass layer, preferably with a thickness in the order of within 10 micrometers which was deposited on the membrane by a screen printing, pressure method. The glass layer has been lapped and the sealing ring is made of a fluoro-elastomeric polymer. Welding of the pot of the housing to the base part of the housing is succeeded by a heat treatment of at least 160° C.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
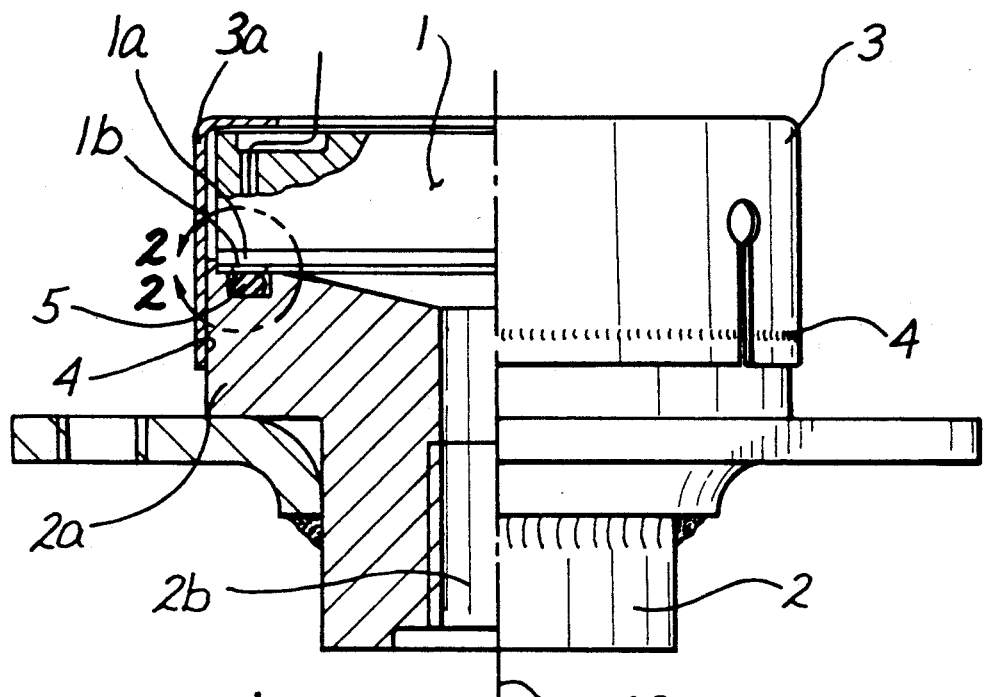
FIG. 1 is a partial side view, partial section view of a pressure measuring transducer in accordance with the preferred embodiment of the invention to practice the best mode thereof, the right hand being the side view, the left hand showing a partial section through this transducer.
Figure 2:
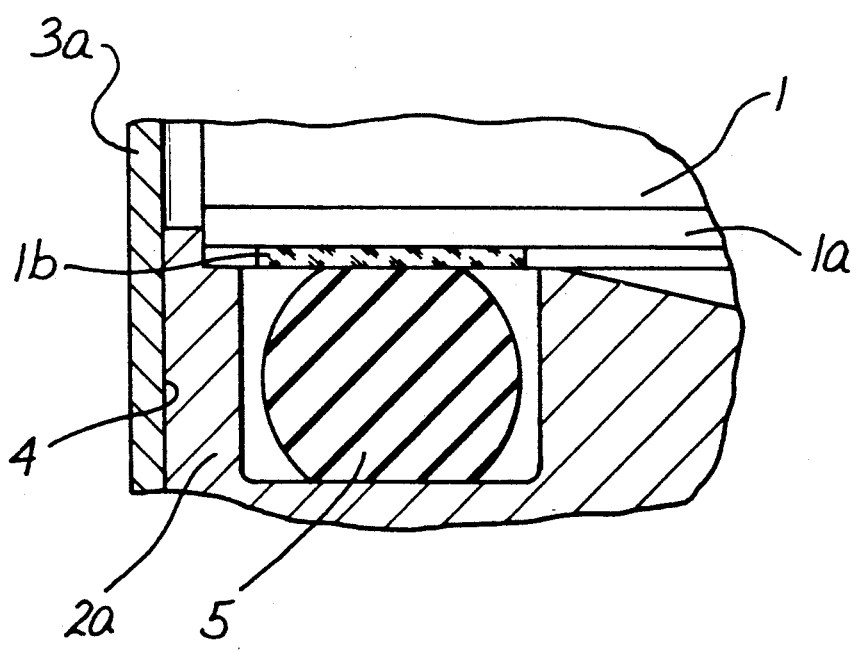
FIG. 2 is a detail of FIG. 2 on an enlarged scale and pertaining particularly to the section portion.
Figure 3:
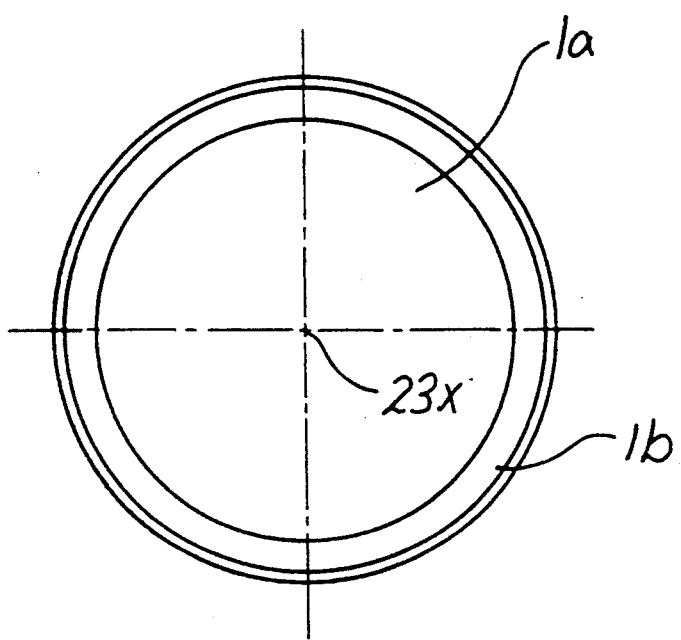
FIG. 3 is a top view of the membrane portion of the pressure sensor included in the transducer of FIG. 1 and 2.

Proceeding now to the detailed description of the drawings, as stated the left hand portion of FIG. 1 illustrates a partial section through a pressure measuring transducer in accordance with the present invention while the right hand portion of the FIG. 1 illustrates a side view of this transducer. As far as details are concerned, the measuring transducer includes a rotationally symmetrical pressure sensor 1 or sensor element made of ceramic material. The one front face of the pressure sensor 1 is provided in a membrane-like configuration 1a. As far as any sensing process proper is concerned, it should be mentioned that the sensor element 1 may operate either on a resistive basis or as an electrically capacitive transducer. In either case there is a pressure dependent deflection of the membrane. In the case of a resistive basis a connection is provided to a tension strip or in the other case there is a change of the capacity between the membrane 1a and the sensor body 1, activated by the membrane as it is deflected under pressure.

The housing is constructed of a rotationally symmetrical base part 2 made, for example, of VA steel. 23x is the axis of rotational symmetry. The base part 2 has, e.g. a central tube-like portion 2b with a central opening and there is a broader flange 2a. In addition, there is a cup or pot-like housing element 3 made, for example, of a nickel-iron alloy. Pot 3 has a side wall 3a which grips around the side wall of the flange portion 2a of the base part 2. The side wall 3a of the pot is connected to the side wall of flange 2a of the base pot 2 by means of a welding seam 4 which has been obtained through electron beam welding.

Basically, part 2 is provided for connection to a process, i.e. for exposing the transducer to a pressurized medium of and in a process facility. For this, then, part 2 is provided with the central bore in the tubular portion 2b; the tube moreover being provided with a threading for connection to a pressure line, conduit pipe or the like. This connection is not shown. The membrane 1a is provided along the edge portion with an annular glass layer or layer-shaped ring 1b. As stated, the thickness of this layer 1b is in the order of 10 micrometers. In the particular example shown the thickness of this layer 1b is assumed to be 12 micrometers.

The glass layer 1b was applied to the membrane 1a by a screen printing method. A lapping process as applied to the glass layer ring improves the quality of the surface of layer 1b as it is deposited. A sealing ring 5 is provided to seal the glass layer 1b and the base part 2. The sealing ring 5 prevents the process medium from penetrating from the space between the membrane 1a and the base part 2, into the space between the pressure sensor 1 and part 3. The membrane 1a and the glass ring 1b face each other axially and ring 1b faces axially the sealing ring 5, and owing to the fact that the front face of pressure sensor 1 is configured as membrane 1a and owing to the fact that a glass layer kind of ring 1b is provided on top of that membrane, the surface roughness of the membrane is reduced. This, in turn, enhances the sealing effect between the sealing ring 5, on the one hand, and the membrane 1a of the sensor 1 on the other hand. In the most simple case, sealing ring 5 is an O-ring made of Buna N which is an artificial caoutchouc or synthetic rubber. A still further and enhanced as well as increased and improved sealing effect obtains if ring 5 is made as a ring fluoro-elastomeric polymer material known and traded under the designation VITON or the modified type traded under the designation KARLEZ.

After the pot or cup 3 has been welded to base part 2, a heat treatment of sensor 1 vulcanized the fluoro-elastomeric polymer material and is bonded to the surface of the glass layer 1a as well as to the VA steel of base part 2. On account of the smooth surface of the glass layer 1b on membrane 1a, one can really obtain a tight connection between sealing 5 and the pressure sensor 1.

The invention is not limited to the embodiments described above but all changes and modifications thereof, not constituting departures from the spirit and scope of the invention, are intended to be included.

We claim:

1. Pressure transducer including a rotationally symmetrical pressure sensor made of a ceramic material and having an axially facing front face configured as a membrane;

a housing for and containing the pressure sensor, the housing having a rotationally symmetrical base part and a pot-like portion with side walls gripping around the base part, and a sealing ring being interposed between the membrane of the pressure sensor and the base part of the housing, the improvement comprising:

a glass layer covering at least a portion of the membrane facing the base part of the housing and axially sealingly engaging said sealing ring, and separating the sealing ring from the membrane.

2. Transducer as in claim 1, said glass layer having a thickness in the order of 10 micrometers.

3. Pressure transducer as in claim 1 wherein said glass layer was deposited by screen printing process.

4. Pressure transducer as in claim 1, the glass layer having been lapped.

5. Transducer as in claim 1, said glass layer being intimately bonded to said sealing ring.

6. Transducer as in claim 5, said sealing ring being a fluoro-elastomeric ring being heat-fused to said glass layer.

7. Transducer as in claim 1, said sealing ring being made of caoutchouc, synthetic rubber or a fluoro-elastic polymer.

* * * * *